(12) United States Patent
Szepanski

(10) Patent No.: US 11,183,958 B2
(45) Date of Patent: Nov. 23, 2021

(54) METHOD FOR CHANGING BETWEEN BLOCK CONTROL AND PWM CONTROL OF AN ELECTRIC MACHINE

(71) Applicants: SEG Automotive Germany GmbH, Stuttgart (DE); Robert Bosch GmbH, Stuttgart (DE)

(72) Inventor: Daniel Szepanski, Jena (DE)

(73) Assignee: SEG Automotive Germany GmbH, Stuttgart (DE)

( * ) Notice: Subject to any disclaimer, the term of this patent is extended or adjusted under 35 U.S.C. 154(b) by 0 days.

(21) Appl. No.: 16/754,960

(22) PCT Filed: Aug. 9, 2018

(86) PCT No.: PCT/EP2018/071588
§ 371 (c)(1),
(2) Date: Apr. 9, 2020

(87) PCT Pub. No.: WO2019/072439
PCT Pub. Date: Apr. 18, 2019

(65) Prior Publication Data
US 2020/0259436 A1 Aug. 13, 2020

(30) Foreign Application Priority Data
Oct. 9, 2017 (DE) ...................... 10 2017 217 913.9

(51) Int. Cl.
*H02P 21/10* (2016.01)
*H02P 21/22* (2016.01)
*H02P 27/12* (2006.01)

(52) U.S. Cl.
CPC .............. *H02P 21/10* (2013.01); *H02P 21/22* (2016.02); *H02P 27/12* (2013.01); *H02P 2201/03* (2013.01)

(58) Field of Classification Search
CPC .................................. H02P 21/10; H02P 21/22
(Continued)

(56) References Cited

U.S. PATENT DOCUMENTS 5,053,689 A * 10/1991 Woodson .................. H02K 3/28
318/705
8,264,181 B2 * 9/2012 Yamakawa ....... H02M 7/53873
318/432
9,800,193 B2 * 10/2017 Mao ........................ H02P 25/22

FOREIGN PATENT DOCUMENTS

DE 102008020786 A1 11/2008
DE 102011076999 A1 11/2012
(Continued)

OTHER PUBLICATIONS

International Patent Application No. PCT/EP2018/071588, International Search Report (ISR) and Written Opinion dated Oct. 23, 2018—16 pages.

(Continued)

*Primary Examiner* — David Luo
(74) *Attorney, Agent, or Firm* — Lathrop GPM LLP

(57) ABSTRACT

The invention relates to a method for operating an electric machine which can be operated using PWM control (A1) and using block control (A3), wherein a transfer control (A2) is used for transfer between the PWM control (A1) and the block control (A3), in which method, within the scope of controlling a torque of the electric machine, a d value of a phase voltage is set as a manipulated variable and a q value of the phase voltage is changed continuously.

14 Claims, 10 Drawing Sheets

(58) Field of Classification Search
USPC .............................. 318/400.02, 400.01, 700
See application file for complete search history.

(56) References Cited

FOREIGN PATENT DOCUMENTS

| | | |
|---|---|---|
| JP | 11-285288 A | 10/1999 |
| JP | 2000-050686 A | 2/2000 |
| JP | 2014-082865 A | 5/2014 |
| JP | 2016-189698 A | 11/2016 |

OTHER PUBLICATIONS

Japanese Patent Application No. 2020-519295, Notice of Reasons for Refusal dated Apr. 21, 2021 with English translation, 9 pages.

\* cited by examiner

METHOD FOR CHANGING BETWEEN BLOCK CONTROL AND PWM CONTROL OF AN ELECTRIC MACHINE

CROSS-REFERENCE TO RELATED APPLICATIONS

This application is a 35 U.S.C. § 371 filing of International Application No. PCT/EP2018/071588 filed Aug. 9, 2018, which claims the benefit of priority to German Patent Application No. 10 2017 217 913.9 filed Oct. 9, 2017, each of which is incorporated herein by reference in its entirety.

The present invention relates to a method for operating an electric machine and also to a computing unit and a computer program for carrying it out.

PRIOR ART

Electric machines, in particular generators, can be used for converting mechanical energy into electrical energy in a motor vehicle. Usually used for this purpose are claw-pole generators, which are mostly provided with electrical excitation. Since claw-pole generators generate rotary current, mostly three-phase, the conventional DC electrical systems of motor vehicles require rectification. Rectifiers on the basis of semiconductor diodes or semiconductor switches may be used for this.

Generators may also be used for starting an internal combustion engine. Such generators are also referred to as starter generators. Usually, such a starter generator is only operated for the engine at very low speeds, since the torque that can be generated quickly decreases in relation to the speed. Larger electric machines are also conceivable, however, and these can then also be used in a hybrid vehicle for driving the vehicle, or at least for assisting the internal combustion engine.

For controlling such starter generators, on the one hand so-called PWM mode, in which a phase current is controlled, or on the other hand so-called block control, in which a pre-commutation angle is variable, may be used. A change between the two types of control may be performed in dependence on a speed threshold.

DISCLOSURE OF THE INVENTION

According to the invention, a method for operating an electric machine and also a computing unit and a computer program for carrying it out having the features of the independent patent claims are proposed. Advantageous refinements are the subject of the subclaims and of the following description.

A method according to the invention serves for operating an electric machine, for example a claw-pole machine, which can be operated with PWM control and with block control. In the case of PWM control or PWM mode, preferably so-called field-oriented control is used. In this case, the phase currents are measured and converted into d-q coordinates or into so-called space vector representation. Parameters of the electric machine can be calculated by way of a fitted polynomial, which represents saturation dependencies, and these parameters and an intended torque can then be used to calculate reference currents, which can then be converted by way of a field-oriented control into voltage reference values (in d-q coordinates). The reference values can subsequently be converted in a PWM control unit into a pulse pattern (for example a so-called center-aligned pulse pattern) and made available to the phases of the electric machine by way of an inverter or power converter.

In the block control or block mode, a so-called pre-commutation angle may be controlled or specified. The pre-commutation angle in this case indicates when with respect to the zero crossover of the induced synchronous generated voltage in a phase the semiconductor switches connected to a phase are switched to conducting. Instead of controlling currents, here the parameters of the machine and the currents at the time can be used to calculate a torque at the time. This can then be compared with an intended torque and the pre-commutation angle can be controlled on the basis of the deviation (for example by a PI controller). The resultant pre-commutation angle can then be converted directly into a block pattern, in that the maximum phase voltage is always applied. In d-q coordinates, the pre-commutation angle may be understood as the angle between the q value and the d value of the phase voltage.

A change from PWM control to block control is conventionally performed whenever the speed of the electric machine exceeds a specified speed threshold or whenever the synchronous generated voltage exceeds the DC-link voltage. The opposite change from block control to PWM control is performed correspondingly, and may have attendant hysteresis, in order to prevent continual changing back-and-forth between the control modes. The speed threshold (up to which the control used is generally stable) may in this case depend on a processor used, or its speed. The synchronous generated voltage is in this case caused by a rotation of the rotor and as a result of induction in the phase windings or phases.

While no jump in voltage in the reference specification of the phase voltages takes place when there is a change as a result of the ratio of the synchronous generated voltage to the DC-link voltage if the DC-link voltage is always fully applied in the block control, it may be the case when there is a change as a result of the speed threshold, in order for example to ensure the stability of the control, that the synchronous generated voltage is lower than the DC-link voltage. Such a jump in voltage leads to a jump in the phase voltage, and consequently in the torque of the electric machine.

For a transfer between PWM control and block control, according to the proposed method a transfer control is therefore used, in which, in the course of controlling a torque of the electric machine, a d value of a phase voltage (the phase voltage is therefore used here in d-q coordinates) is set as a manipulated variable, and a q value of the phase voltage is steadily changed, i.e. in particular is changed (quasi) continuously. When there is a transfer from PWM control to block control, the q value of the phase voltage is preferably increased, when there is a transfer from block control to PWM control, the q value of the phase voltage is preferably reduced. The q value may in this case be changed with a specified gradient. A value used last in the previous control (that is to say PWM control or block control) expediently comes into consideration in this case as the starting point for changing the q value of the phase voltage.

Instead of provoking a jump in voltage, such transfer control has the effect of only slowly changing the q value of the phase voltage, while the d value remains substantially constant. Since the d value has a decisive influence on the q value of the phase current, it remains substantially unchanged. The q value of the phase current has in turn a decisive influence on the torque of the electric machine, which therefore likewise remains substantially constant.

Advantageously, the transfer from PWM control to block control is performed directly and without the transfer control if at the beginning of the transfer a synchronous generated voltage of the electric machine is greater than or equal to a DC-link voltage of the electric machine multiplied by a factor of 2/Pi. The transfer from block control to PWM control is preferably performed directly and without the transfer control if at the beginning of the transfer a synchronous generated voltage of the electric machine is less than or equal to the DC-link voltage of the electric machine multiplied by a factor of 2/Pi. In this case, a specifiable offset, which depending on the direction of the transfer is positive or negative, can preferably be respectively taken into account. In these cases, no jump in voltage occurs even when there is a direct transfer, and so the transfer control is not required. A certain jump in voltage, of for example a maximum of 0.5 V, can however also be accepted. With the factor of 2/Pi, a conversion into a maximum-settable, sinusoidal fundamental oscillation is made possible in the block control.

Advantageously, a change from PWM control to transfer control is performed when a speed of the electric machine is greater than a specifiable speed threshold, preferably plus a specifiable positive offset. In this case, therefore, it cannot be assumed that the synchronous generated voltage is equal to or greater than the DC-link voltage, and so with the transfer control a jump in voltage can be prevented.

It is of advantage if a change from transfer control to block control is performed if an amount of the phase voltage, here in particular an internal reference phase voltage, in d-q coordinates is equal to or greater than the DC-link voltage multiplied by a factor of 2/Pi. Here, the voltage has then been increased by the transfer control to the extent that no jump in voltage, and consequently also no jump in torque, occurs any longer.

It is preferred if a change from block control to transfer control is performed if a speed of the electric machine is less than a specifiable speed threshold, preferably minus a specifiable positive offset. In this case, it therefore cannot be assumed that the synchronous generated voltage is still equal to or greater than the DC-link voltage, and so with the transfer control a jump in voltage can be prevented.

Advantageously, a change from transfer control to PWM control is performed if a d value of a phase current is equal to or less than a reference value for the d value of the phase current in the PWM control, preferably minus a specifiable positive offset. Since no value for a voltage is known in advance here, it can be achieved by the condition for the current mentioned that no jump in voltage or torque takes place.

The offset may be used in the cases mentioned—in the sense of a hysteresis—to prevent a continual change between the control modes from taking place at the limit.

A computing unit according to the invention, for example a control device of a motor vehicle, is designed, in particular in terms of programming, for carrying out a method according to the invention.

Implementation of the method in the form of a computer program is also advantageous, since this causes particularly low costs, in particular if an executing control unit is also used for other tasks, and is therefore present in any case. Suitable data carriers for providing the computer program are in particular magnetic, optical and electrical stores, such as for example hard disks, flash memories, EEPROMs, DVDs, etc. Downloading of a program over computer networks (Internet, intranet, etc.) is also possible.

Further advantages and refinements of the invention are provided by the description and the accompanying drawing.

The invention is schematically represented in the drawing on the basis of an exemplary embodiment and is described below with reference to the drawing.

EMBODIMENT(S) OF THE INVENTION

Figure 1:
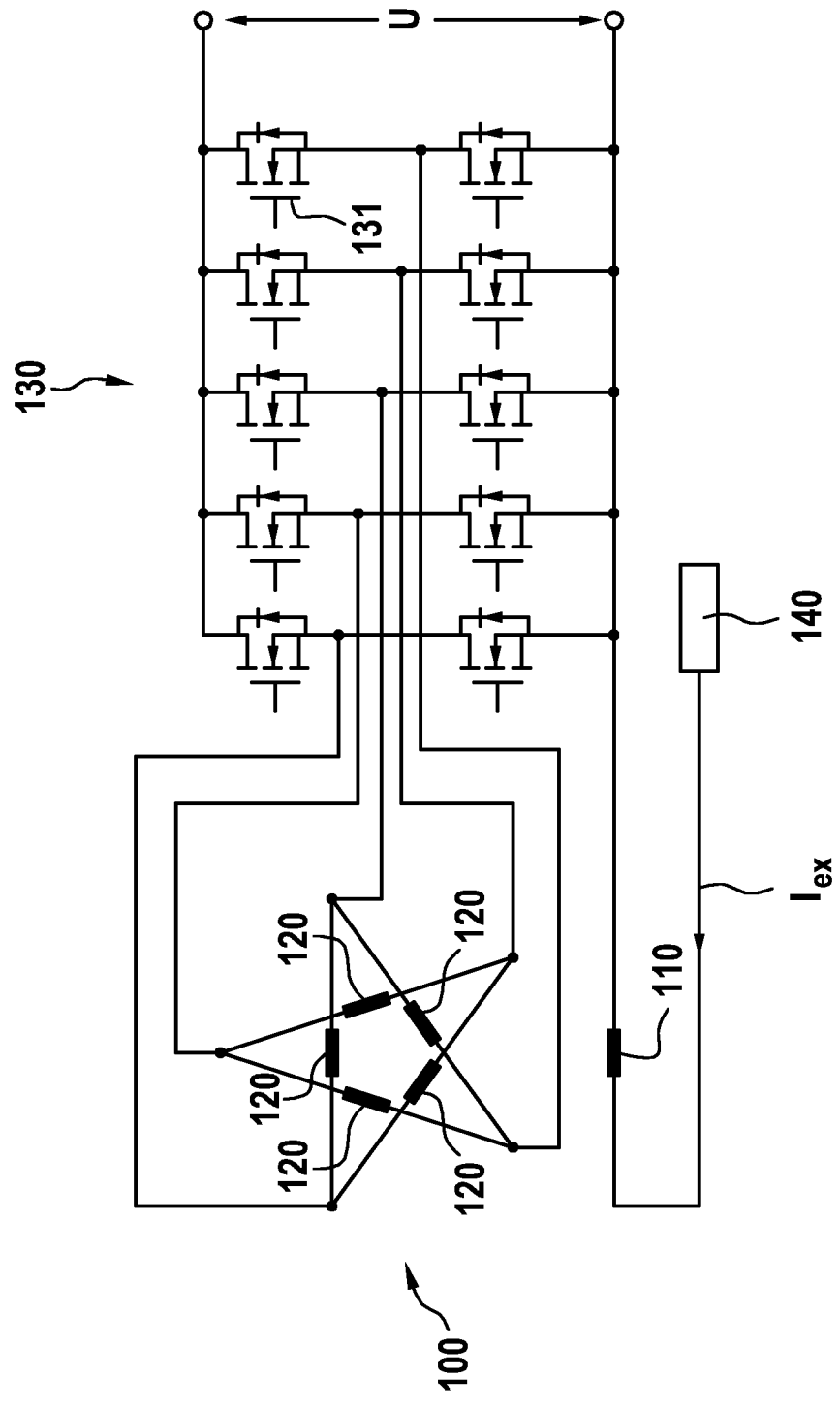
FIG. 1 schematically shows an electric machine in which a method according to the invention can be carried out.

In FIG. 1, an electric machine in which a method according to the invention can be carried out is represented schematically and as a circuit diagram. The electric machine 100 is formed here by way of example as an externally excited, five-phase electric machine. It goes without saying that a different number of phases, for example three, may also be used. The electric machine 100 may also be formed for example as a claw-pole machine.

Here, the electric machine 100 has five stator windings 120 and one exciter or rotor winding 110. By way of a computing unit formed as a control unit 140, an exciter current $I_{ex}$ can be formed in the exciter winding 110. Also provided is a switching arrangement 130 with switches 131, here by way of example MOSFETs, only one of which is provided with a reference sign, by means of which a voltage U can be applied to the stator windings 120 or picked off, depending on whether the electric machine is being operated as a starter for the engine or as a generator.

The switch arrangement 130 and the control unit 140 may also in each case be part of a common control unit or an inverter for the electric machine.

Figure 2:
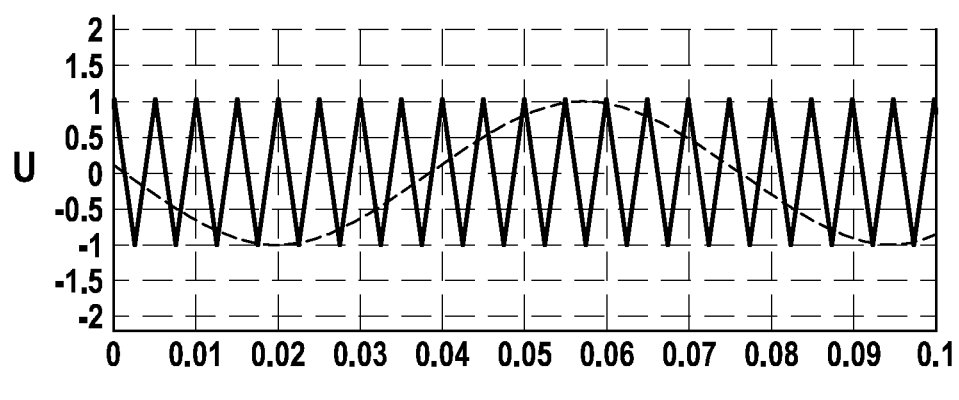
FIG. 2 schematically shows a possibility for controlling an electric machine.
Figure 2:
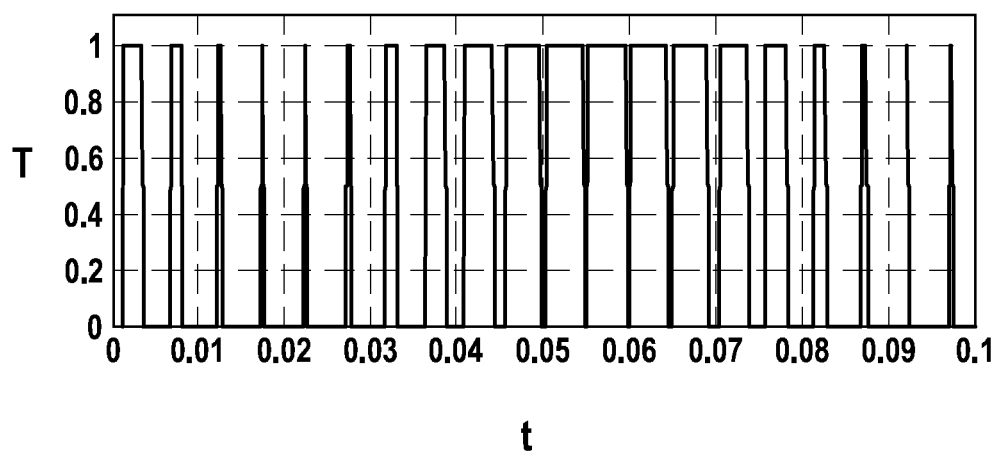

In FIG. 2, a possibility for controlling an electric machine such as that shown for example in FIG. 1 is schematically represented. In the upper diagram, a voltage U is shown over time t, in the lower diagram a duty cycle T over time t.

This is a control pattern on the basis of a standard method of so-called triangle sine modulation. The desired intended voltage, to be specific the sine profile in the upper diagram, is overlaid here by a triangle signal (also shown in the upper diagram), that has a much higher frequency than that of the electrical fundamental wave (generally more than 10 kHz). Each point of intersection indicates a switchover of the PWM signal.

The control pattern in the lower diagram can thus be generated by a PWM control unit. For a claw-pole machine, this PWM control is generally used up to the voltage limit mentioned. As from or above the voltage limit, the electric machine is then controlled by a block pattern in block mode or by the so-called block control.

This block control is distinguished by the fact that the phase voltages have the maximum possible amplitude and this amplitude is not variable (theoretically this is possible by control with block widths of less than 180°, but this is generally not used).

Therefore, along with the exciter current, the phase position of the voltage vector, the so-called pre-commutation angle, serves as the manipulated variable for a desired intended torque of the electric machine.

Since the amplitude cannot be changed (or at least is not changed) in block mode, this type of control is only used above the voltage limit (i.e. when the synchronous generated voltage is greater than the DC-link voltage applied); in the present case, typically at speeds greater than 3000 rpm.

Figure 3:
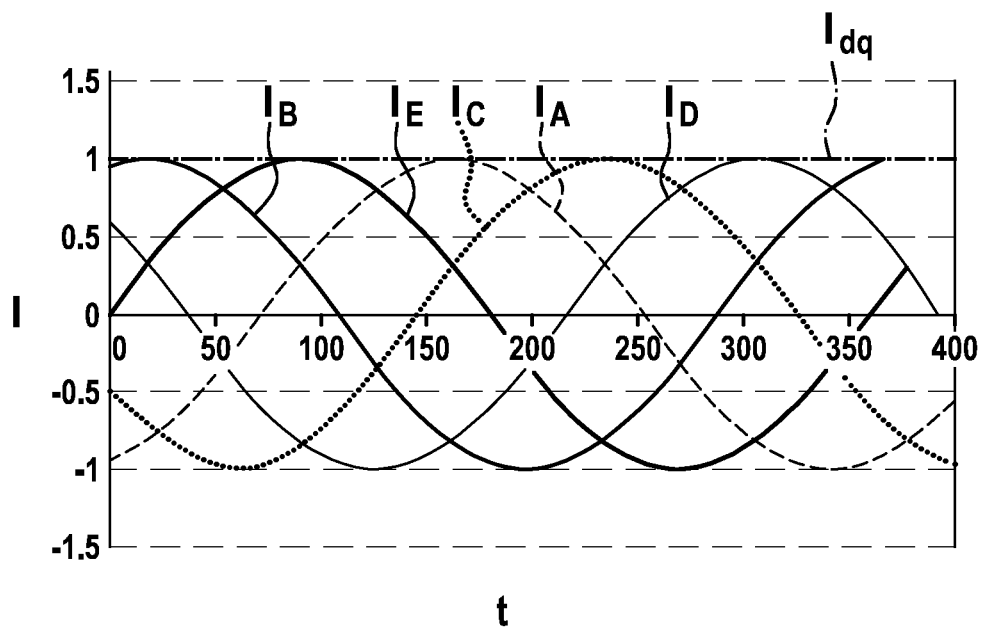
FIG. 3 schematically shows current profiles in the case of an electric machine.

Shown in FIG. 3 are current profiles, here the phase currents, that are generated with a rotating electric machine and sinusoidal phase voltage specification. For this, a current I is plotted over time t.

With symmetrical distribution, the individual phase currents $I_A$, $I_B$, $I_C$, $I_D$ and $I_E$ can be combined to give a space vector. For this, the known Clarke and Park transforms are used. First, the currents $I_\alpha$ and $I_\beta$ are obtained with the Clarke transform according to the formulas:

$$I_\alpha = \left(I_A + I_B \cos\left(\frac{2\pi}{5}\right) + I_C \cos\left(\frac{4\pi}{5}\right) + I_D \cos\left(\frac{6\pi}{5}\right) + I_E \cos\left(\frac{8\pi}{5}\right)\right) \text{ and}$$

$$I_\beta = \left(I_B \sin\left(\frac{2\pi}{5}\right) + I_C \sin\left(\frac{4\pi}{5}\right) + I_D \sin\left(\frac{6\pi}{5}\right) + I_E \sin\left(\frac{8\pi}{5}\right)\right).$$

They are then used to obtain the currents $I_d$ and $I_q$ with the Park transform according to the formulas:

$$I_d = I_\alpha \cos\theta + I_\beta \sin\theta \text{ and } I_q = -I_\alpha \sin\theta + I_\beta \cos\theta,$$

where $\theta$ denotes here the angle of the rotor of the electric machine. In the same way, the voltage can also be transformed into d-q coordination.

Figure 4:
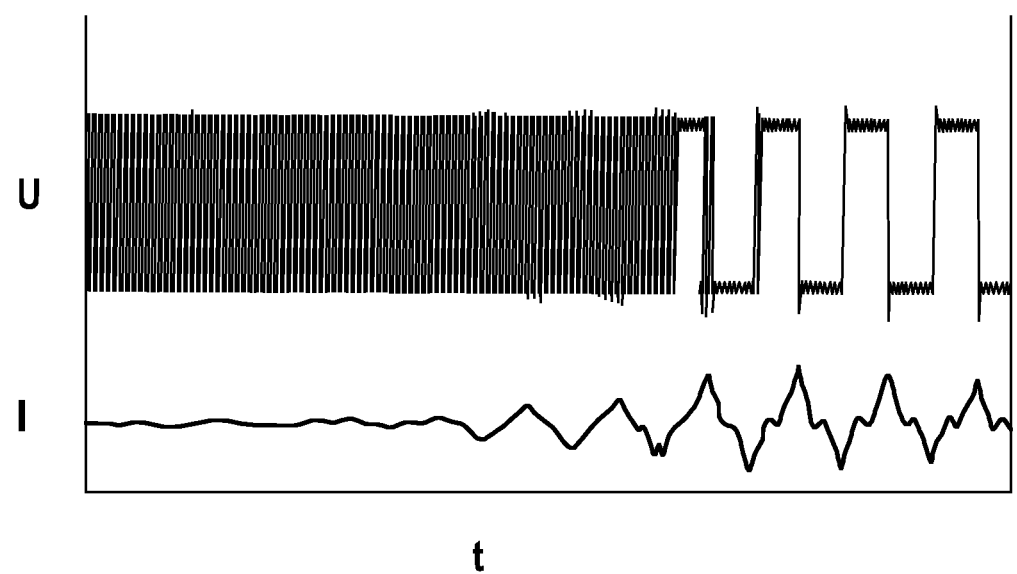
FIG. 4 shows a phase voltage of a phase for a transfer between PWM control and block control.

Represented in FIG. 4 is the phase voltage of a phase for the transfer between PWM control and block control or block mode. For this, the voltage U and the current I are plotted over time t. In this case, it can be seen from the profile of the current that no control of the phase current is taking place any longer here.

Figure 5A:
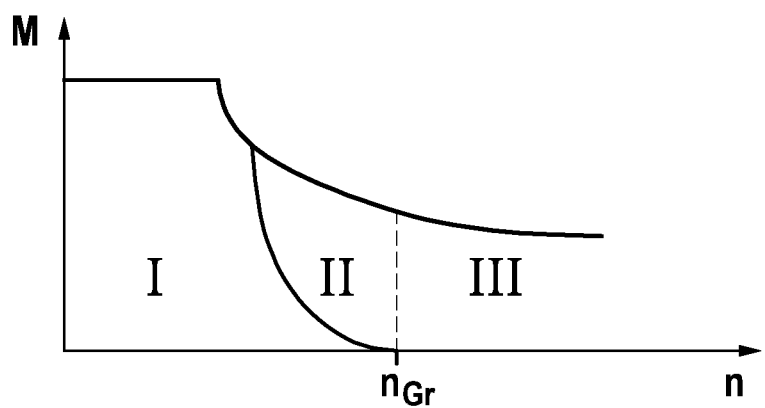
FIGS. 5a and 5b show regions for different types of control.
Figure 5B:
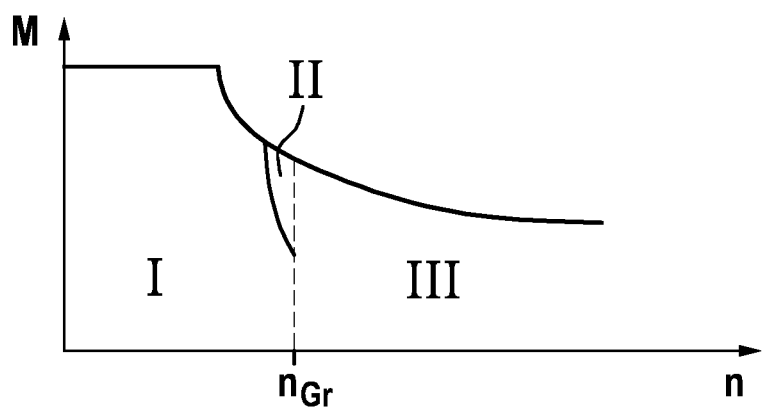

In FIGS. 5a and 5b, regions for different types of control are shown, on the basis of which the control strategy in the case of the present method is to be explained. For this, a torque M is in each case plotted over a speed n of the electric machine.

The region I in this case indicates such a region in which the synchronous generated voltage is still less than the DC-link voltage. The region III indicates a region in which the speed n is greater than the speed threshold $n_{Gr}$.

For higher torques, in the case of an externally excited electric machine usually a higher exciter current is set, and so the synchronous generated voltage already exceeds the DC-link voltage at a lower speed than the limiting speed $n_{Gr}$. For a constant exciter current, the synchronous generated voltage increases proportionally.

The limiting speed $n_{Gr}$ in this case denotes the speed threshold up to which the phase current control is stable. This speed is dependent on the sampling frequency of the controller. Depending on the situation and the desired accuracy of the controller in PWM mode, speed thresholds can be set here in such a way that the sampling frequencies corresponds to at least twice to twenty times a frequency corresponding to the speed threshold. The speed threshold up to which the controller is stable is also dependent on the speed of the processor used.

Up to the limit at which the synchronous generated voltage is less than the DC-link voltage (region I), or up to the speed threshold $n_{Gr}$ (on the left of region III), the phase currents are controlled and the pulse pattern is generated by way of PWM. As soon as the synchronous generated voltage is greater than the DC-link voltage when the speed threshold is reached, the phase currents are no longer controlled, but the maximum phase voltage is set in the block pattern and the pre-commutation angle is controlled.

In the case represented in FIG. 5a, the speed threshold is therefore so great that—irrespective of the torque at the time—the region II is always reached before the speed threshold $n_{Gr}$ is exceeded. This means that a PWM block transfer without a jump in voltage can always take place. In the region II, block mode can also be used.

In the case represented in FIG. 5b, on the other hand, it can be seen that the speed threshold $n_{Gr}$ for smaller torques is less than the ideal transfer point for block mode, to be specific where the regions I and III adjoin one another. In this case, on account of the speed threshold, it is necessary for the stability of the phase current control to switch over to block mode.

If at this speed a transfer from PWM control to block control is performed, the voltage jumps and there is a jump in torque.

Figure 6:
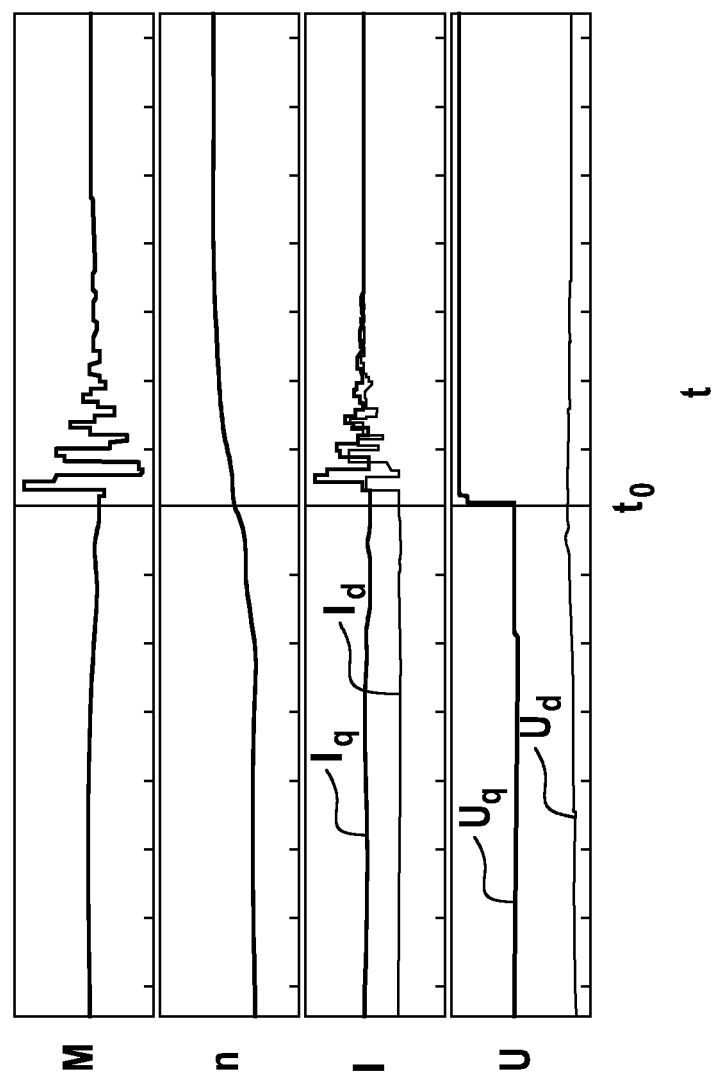
FIG. 6 shows different variables of the electric machine without use of a method according to the invention.

Such behavior is represented in FIG. 6. For this, a torque M, a speed n, a current I and a voltage U are plotted over time t. At the time t0, the transfer from PWM control to block control is performed, here at a speed of about 3800 rpm.

At the transfer point, a jump in the phase voltages $U_d$ and $U_q$ can be seen. The torque jumps here from about −1.7 Nm to +4 Nm and the phase currents $I_d$ and $I_q$ begin to oscillate. About 15 ms elapse before the complete jump in the phase voltage is corrected. This problem is solved by the present method, as still to be explained in more detail below.

Figure 7:
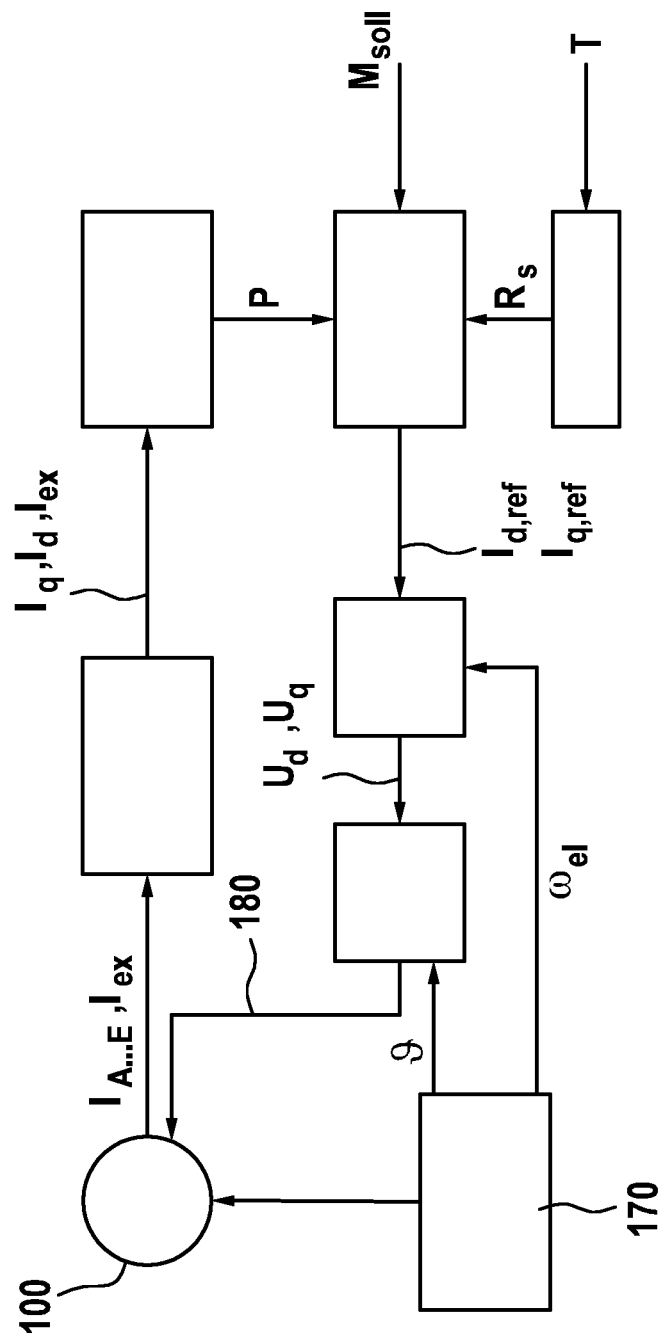
FIGS. 7, 8 and 9 show three different types of control, as can be used in the case of a method according to the invention in a preferred embodiment.
Figure 8:
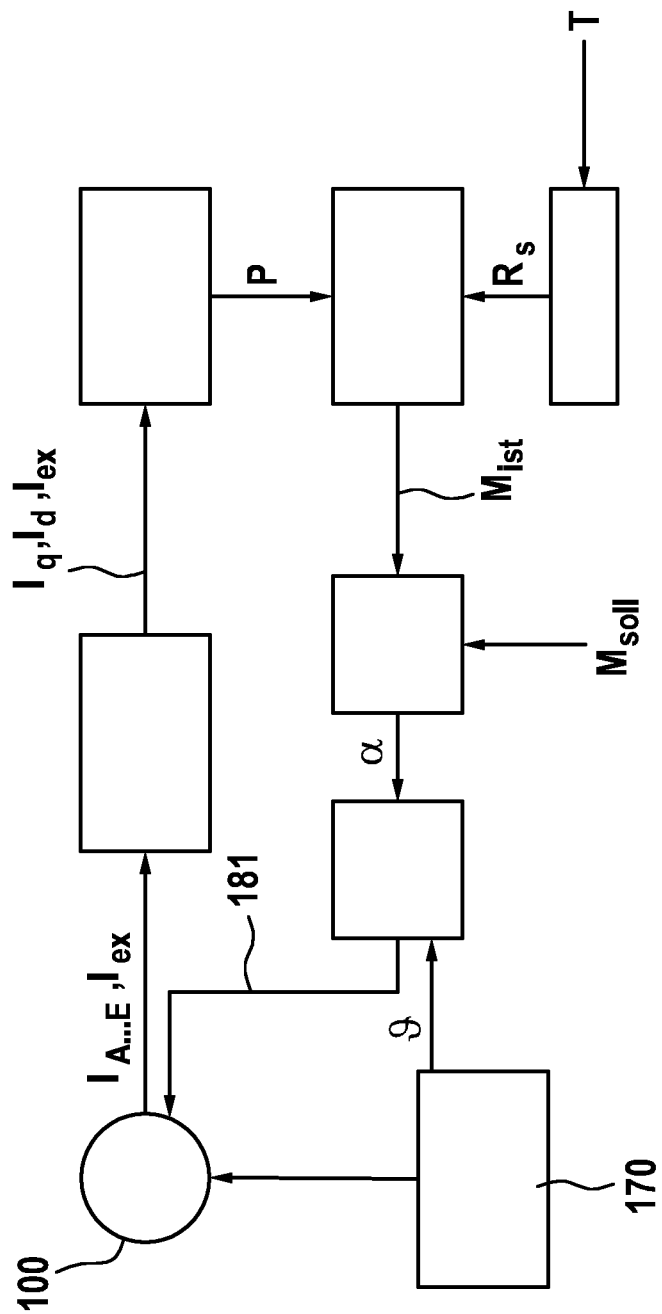
Figure 9:
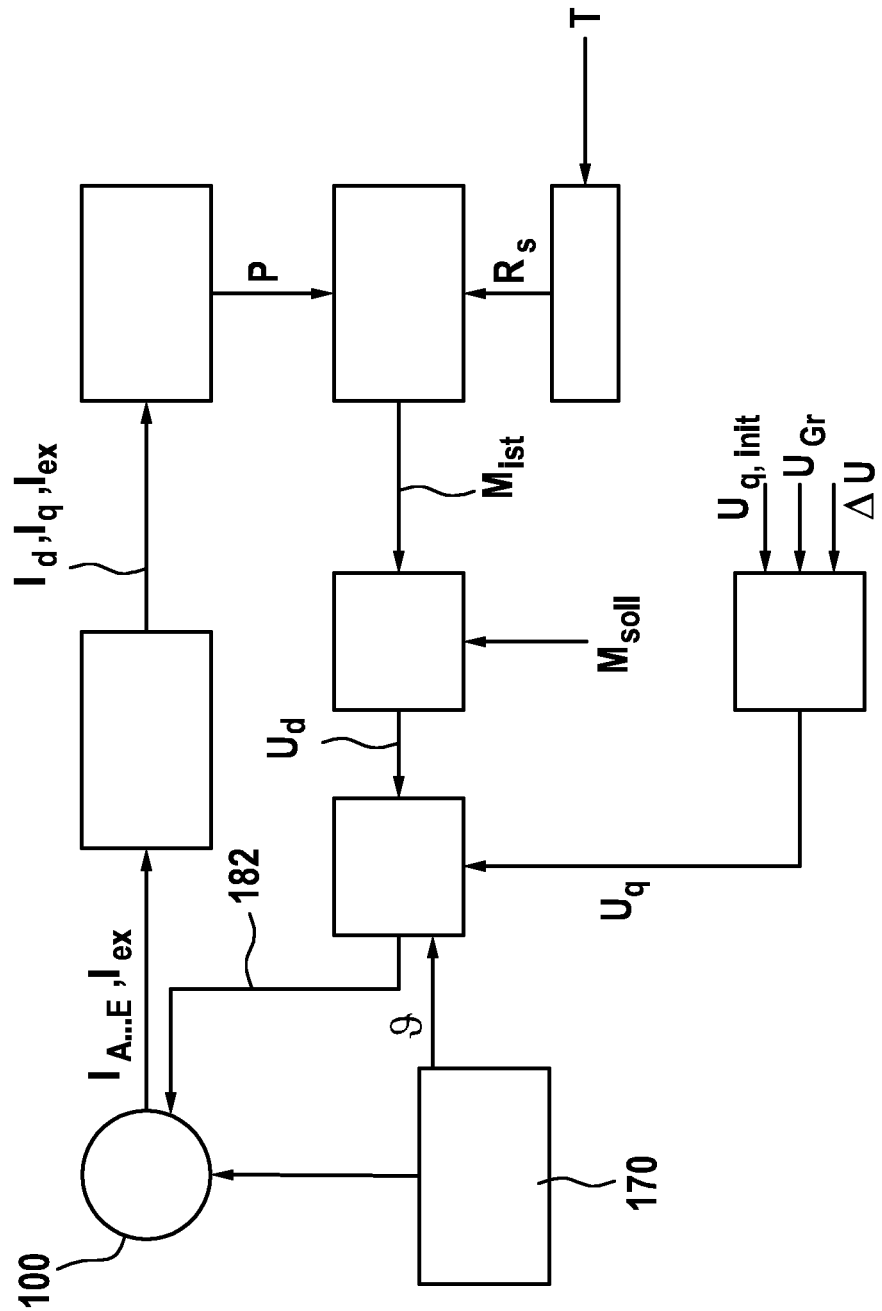

In FIGS. 7, 8 and 9, three different types of control, as can be used in a preferred embodiment in the case of the method according to the invention, are explained. These individual types of control can in this case be carried out as a controller or in the course of a control process.

In FIG. 7, PWM control or PWM mode with field-oriented control is shown. The phase currents, denoted here by $I_{A\ldots E}$, are measured and converted into space vector representation as $I_q$ and $I_d$. The exciter current $I_{ex}$ in the exciter winding is also recorded. The parameters P of the electric machine, such as for example inductances and interlinked fluxes, are calculated with the aid of the currents $I_q$, $I_d$, $I_{ex}$ by way of a polynomial and by taking into account saturation properties. The parameters P and an intended torque $M_{soll}$ are used to calculate reference currents $I_{q,ref}$ and $I_{d,ref}$ and convert them by way of a field-oriented control into voltage reference values $U_d$ and $U_q$. A temperature T and, dependent on it, the resistance $R_S$ of the stator may be taken into account for the calculation of the reference currents.

The reference values are subsequently converted in a PWM control unit into a pulse pattern 180, for example a center-aligned pulse pattern, and are made available at the phases of the electric machine 100 by way of an inverter or power converter. A rotor position angle $\vartheta$ and an electrical angular frequency $\omega_{el}$ can also in this case be determined by way of a sensor 170 and then taken into account.

In FIG. 8, block control or block mode with control of the pre-commutation angle is shown. Instead of controlling currents, here the parameters P of the electric machine and the currents $I_q$, $I_d$ at the time are used to calculate the torque $M_{ist}$ the time. This is compared with the intended torque $M_{soll}$ and the pre-commutation angle is controlled on the basis of the deviation (preferably a PI controller). The resultant pre-commutation angle, denoted here by α, is converted directly into a block pattern 181, in the case of which the maximum phase voltage is always applied. Otherwise, reference should be made to the description relating to FIG. 7, though here the electrical angular frequency $\omega_{el}$ is not required.

In FIG. 9, transfer control with controlling of the q value of the phase voltage is shown. This represents a mixture of the two previously explained types of control. The torque $M_{ist}$ the time is again compared with the intended torque $M_{soll}$, but only the d value of the phase voltage $U_d$ is controlled or set. The q value of the phase voltage $U_q$ is increased with a fixed gradient ΔU, starting from the initial value $U_{q,init}$. It is conceivable to take into account a voltage limit $U_{Gr}$. The initial value is the last value of the block control or the PWM control. A pulse pattern 182 is then set here by a PWM unit.

Figure 10:
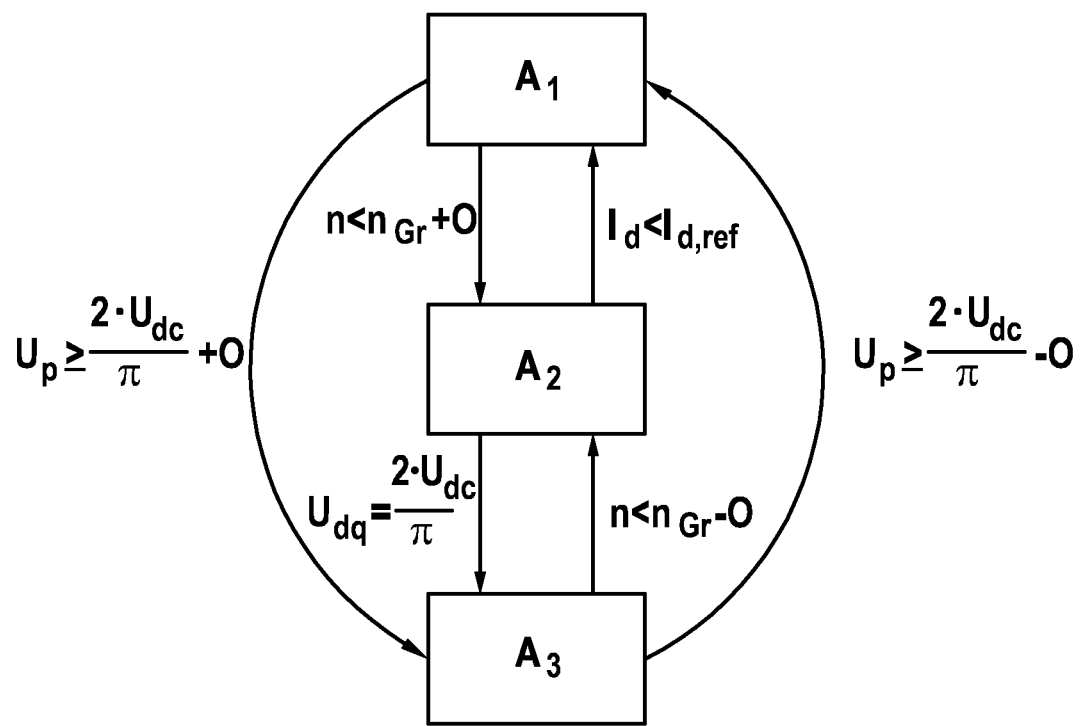
FIG. 10 shows a sequence of a method according to in a further preferred embodiment.

In FIG. 10, transfers between the individual types of control are then represented in a further preferred embodiment in the case of a method according to the invention.

If the synchronous generated voltage $U_P$ is greater than the DC-link voltage $U_{dc}$ multiplied by the factor of 2/Pi, the condition for a direct transfer between PWM control $A_1$ and block control $A_3$ is satisfied and transfer control $A_2$ is not required. The factor 2/Pi allows the conversion into the maximum-settable, sinusoidal fundamental oscillation in the block mode.

If a transfer is to take place as a result of the speed threshold $n_{Gr}$, transfer control $A_2$ is used. A hysteresis or an offset O may be respectively used for the individual conditions, in order to avoid continual changing of the states.

If transfer control $A_2$ is used from PWM control $A_1$ and the condition "speed n greater than speed threshold $n_{Gr}$ (n>$n_{Gr}$)" is still satisfied, the q value of the phase voltage is increased with a fixed gradient until the condition that the amount of the phase voltage $U_{dq}$ is equal to, or at least approximately equal to, the DC-link voltage $U_{dc}$ multiplied by the factor of 2/Pi is satisfied. The d value of the phase voltage is controlled to the respectively required torque. Physically, increasing $U_q$ brings about an increase in the d current, and so the field is intensified, the synchronous generated voltage becomes greater and a smooth transfer is made possible.

If, during the transfer, the condition "n>$n_{Gr}$" is violated, then, as long as the condition is unfulfilled or violated, the q value of the phase voltage is no longer incremented, but decremented, and a change back to PWM mode is made.

If transfer control $A_2$ is used from block mode, $U_q$ is initialized with the last value from block mode and decremented. Since in the case of PWM control $A_1$ a transfer voltage is not known in advance, here the condition is that the set d current is less than the reference $I_{d,ref}$ in PWM mode. This shows that the field is weakened more than would be optimum at the respective operating point, and consequently represents a fulfilled transfer condition.

Figure 11:
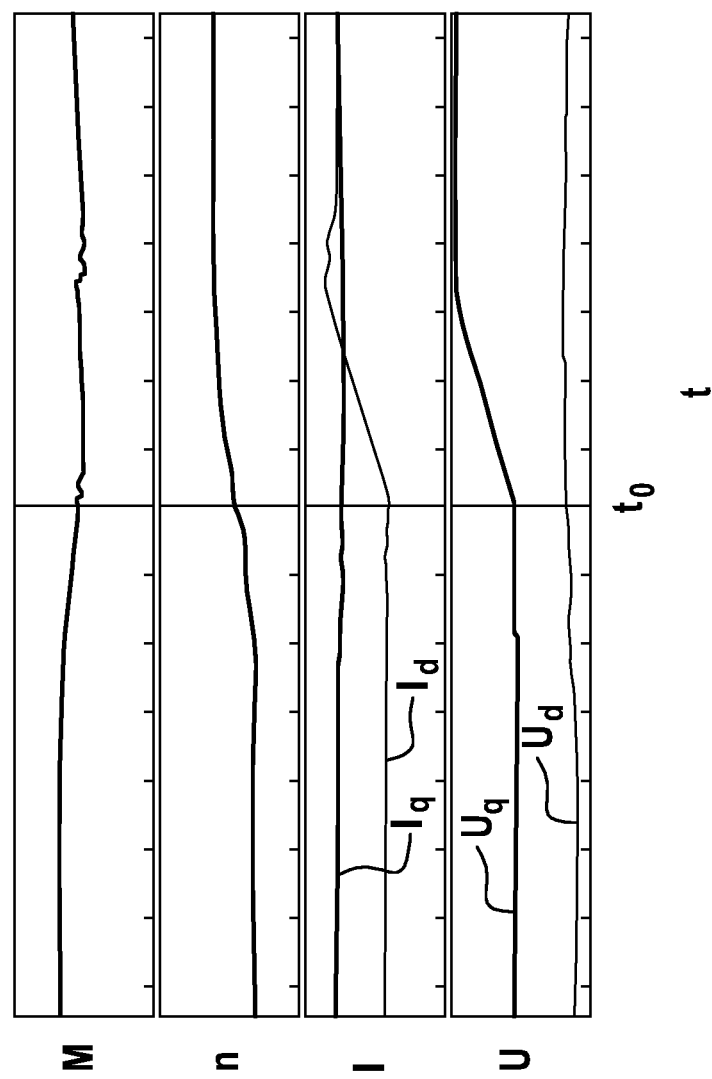
FIG. 11 shows different variables of the electric machine when using a method according to the invention in a further preferred embodiment.

In FIG. 11, the variables from FIG. 6 are represented once again, but here using the transfer control. Instead of provoking a jump in voltage in $U_d$ and $U_q$, the voltage is therefore slowly incremented for $U_q$ (gradient for example at 400 V/s). $U_d$ remains approximately constant, since $U_d$ in this case has the influence on the current $I_q$, $I_q$ has a decisive effect on the set torque, and the required torque in the region represented is virtually constant (here with control to a constant power output). The d current increases from about −31 A to just over 0 A. In comparison with FIG. 6, a constant torque is then obtained at the transfer.

The invention claimed is:

1. A method for operating an electric machine, comprising:
   in the course of controlling a torque of the electric machine, using a transfer control to transfer between PWM control and block control, said using a transfer control including setting a d value of a phase voltage as a manipulated variable, and steadily changing a q value of the phase voltage, wherein:
   when the transfer is from PWM control to block control, the q value is increasing; and
   when the transfer is from block control to PWM control, the q value is decreasing.

2. The method as claimed in claim 1, wherein the step of steadily changing the q value comprises changing the q value with a specified gradient.

3. The method as claimed in claim 1, wherein the step of steadily changing the q value comprises starting from a value used last in a preceding one of the PWM control and the block control.

4. The method as claimed in claim 1, further comprising:
   if at the beginning of transfer from PWM control to block control a synchronous generated voltage of the electric machine is greater than or equal to a DC-link voltage of the electric machine multiplied by a factor of 2/Pi plus a specifiable offset, then performing the transfer from PWM control to block control directly and without the transfer control, the specifiable offset being positive or zero; and
   if at the beginning of transfer from block control to PWM control the synchronous generated voltage is less than or equal to the DC-link voltage multiplied by a factor of 2/Pi minus a specifiable offset, then performing the transfer from block control to PWM control directly and without the transfer control.

5. The method as claimed in claim 4, the specifiable offset being positive.

6. The method as claimed in claim 1, further comprising changing from PWM control to block control when a speed of the electric machine is greater than a specifiable speed threshold plus a specifiable offset, the specifiable offset being positive or zero.

7. The method as claimed in claim 6, the specifiable offset being positive.

8. The method as claimed in claim 1, comprising changing from transfer control to block control if an amount of the phase voltage in d-q coordinates is equal to or greater than a DC-link voltage multiplied by a factor of 2/Pi.

9. The method as claimed in claim 1, comprising changing from block control to transfer control if a speed of the electric machine is less than a specifiable speed threshold minus a specifiable offset, the specifiable offset being positive or zero.

10. The method as claimed in claim 9, the specifiable offset being positive.

11. The method as claimed in claim 1, comprising changing from transfer control to PWM control if a d value of a phase current is equal to or less than a reference value for the d value of the phase current in the PWM control minus a specifiable offset, the specifiable offset being positive or zero.

12. The method as claimed in claim 11, the specifiable offset being positive.

13. A machine-readable storage medium comprising a computer program configured to, when run on a computing unit in the course of controlling a torque of an electric machine, using a transfer control to transfer between PWM control and block control, said using a transfer control including setting a d value of a phase voltage as a manipulated variable, and steadily changing a q value of the phase voltage, wherein:
   when the transfer is from PWM control to block control, the q value is increasing; and
   when the transfer is from block control to PWM control, the q value is decreasing.

14. A computing unit for controlling a torque of an electric machine, comprising the machine-readable storage medium of claim 13.

\* \* \* \* \*